Figure 1:
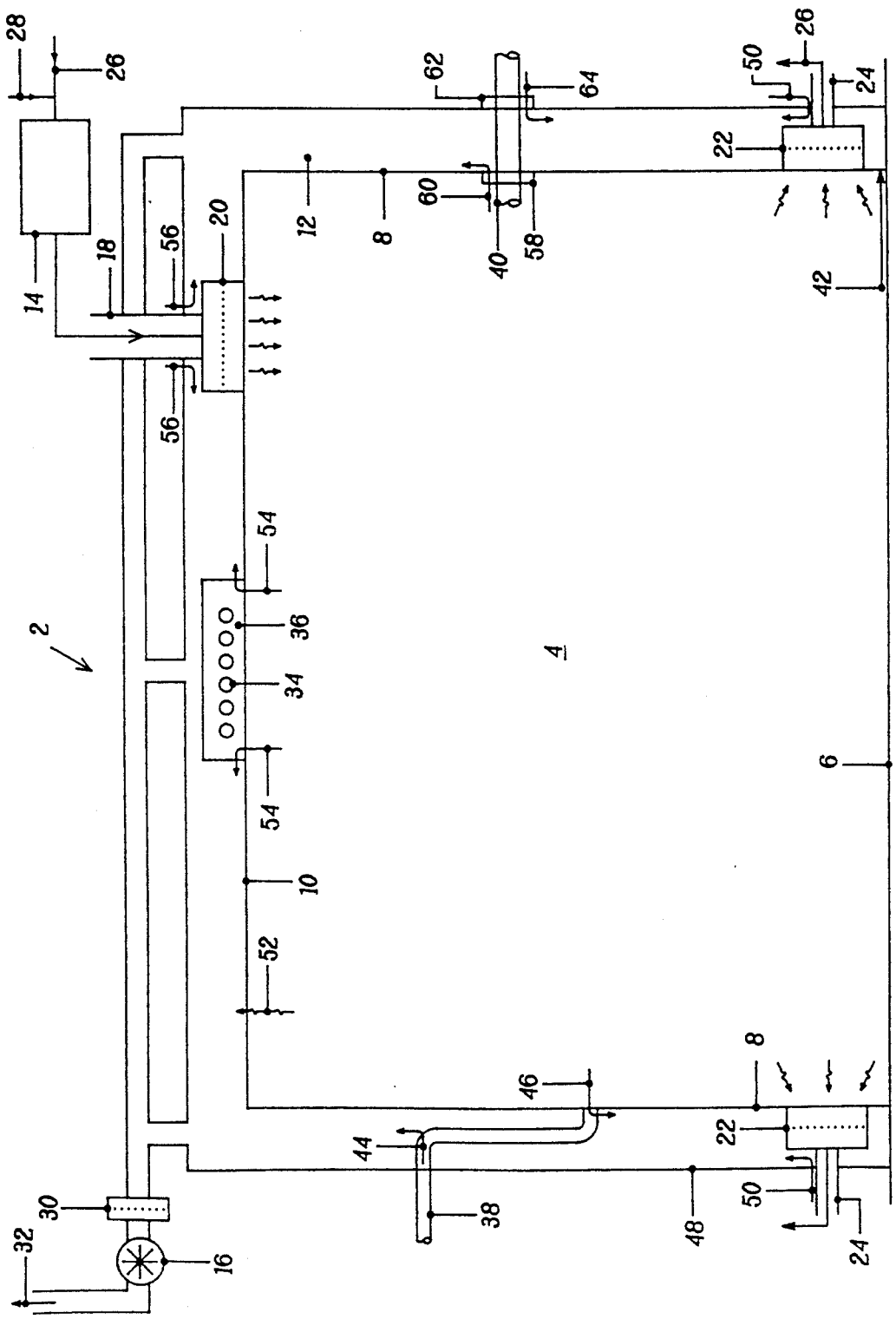

United States Patent [19]

Challenger

[11] Patent Number: 5,316,518
[45] Date of Patent: May 31, 1994

[54] CLEAN CONTAINMENT ROOM CONSTRUCTION

[75] Inventor: John G. Challenger, Newbury, United Kingdom

[73] Assignee: Clean Room Construction (London) Ltd., London, United Kingdom

[21] Appl. No.: 11,174

[22] Filed: Jan. 29, 1993

[30] Foreign Application Priority Data

Jan. 31, 1992 [GB] United Kingdom ............... 9202154

[51] Int. Cl.$^5$ ............................................. F24F 7/007
[52] U.S. Cl. .................................. 454/187; 55/279; 55/385.2; 454/228
[58] Field of Search ............. 55/385.2, 279; 454/185, 454/186, 187, 228, 236

[56] References Cited

U.S. PATENT DOCUMENTS

| | | | |
|---|---|---|---|
| 4,523,519 | 6/1985 | Johnson | 454/185 |
| 4,850,268 | 7/1989 | Saito et al. | 454/187 X |
| 5,195,922 | 3/1993 | Genco | 454/187 |

*Primary Examiner*—Harold Joyce
*Attorney, Agent, or Firm*—Joseph S. Iandiorio

[57] ABSTRACT

A clean containment room construction (2) comprising a work room (4) having a floor (6), walls (8) and a ceiling (10), an isolation void (12) which surrounds the walls (8) and the ceiling (10) of the work room (4), air-circulating apparatus (14) for maintaining a circulation of air in the workroom (4) which is at a positive pressure with respect to atmospheric pressure, and air-circulating apparatus (16) for maintaining air in the isolation void (12) which is at a negative pressure with respect to atmospheric pressure.

8 Claims, 2 Drawing Sheets

CLEAN CONTAINMENT ROOM CONSTRUCTION

This invention relates to a clean containment room construction.

Clean containment room constructions are known and they are used for conducting work in controlled environments. For example, if the work is to be conducted with hazardous substances which are air borne, then it is customary to conduct the work in a clean containment room construction which is intended to prevent the escape of the hazardous substance, for example a biological material, a radio active material or a chemically hazardous substance, into the environment. Known clean containment room constructions comprise a work room having a floor, walls and a ceiling, and an isolation void which surrounds the walls and the ceiling of the work room. In the known clean containment room constructions, the work room is maintained at a negative pressure with respect to atmospheric pressure, in order to ensure that air borne substances in the work room cannot escape to atmosphere. Because the atmosphere is at a higher pressure than the work room, air tends to leak into the work room. This air tends to bring with it contaminants and so it is customary continuously to filter the air supplied into the work room. In spite of this filtering, the air in the work room is often not as contaminant-free as is desirable.

It is an aim of the present invention to obviate or reduce the above mentioned problem.

Accordingly, in one non-limiting embodiment, the present invention provides a clean containment room construction comprising a work room having a floor, walls and a ceiling, an isolation void which surrounds the walls and the ceiling of the work room, air-circulating apparatus for maintaining a circulation of air in the work room which is at a positive pressure with respect to atmospheric pressure, and air-evacuating apparatus for maintaining air in the isolation void which is at a negative pressure with respect to atmospheric pressure.

The present invention is based on the realisation that a work room in a clean containment room construction can be kept cleaner if it is maintained at an air pressure which is positive with respect to atmospheric pressure rather than at a pressure which is negative with respect to atmospheric pressure. With the clean contaminant room construction of the present invention, the negative pressure in the isolation void ensures that any containment in the work room can only escape to the isolation void and cannot escape to the atmosphere. Also, any contaminants from the atmosphere which leak into the clean containment room construction, only pass as far as the isolation void and they cannot pass from the isolation void into the work room because the work room is at a higher pressure than the isolation void.

The clean containment room construction may include filter means for filtering the air into and out of the work room. Also usually, the clean containment room construction will include filter means for filtering the air from the isolation void before the air from the isolation void is vented to atmosphere.

Figure 2:
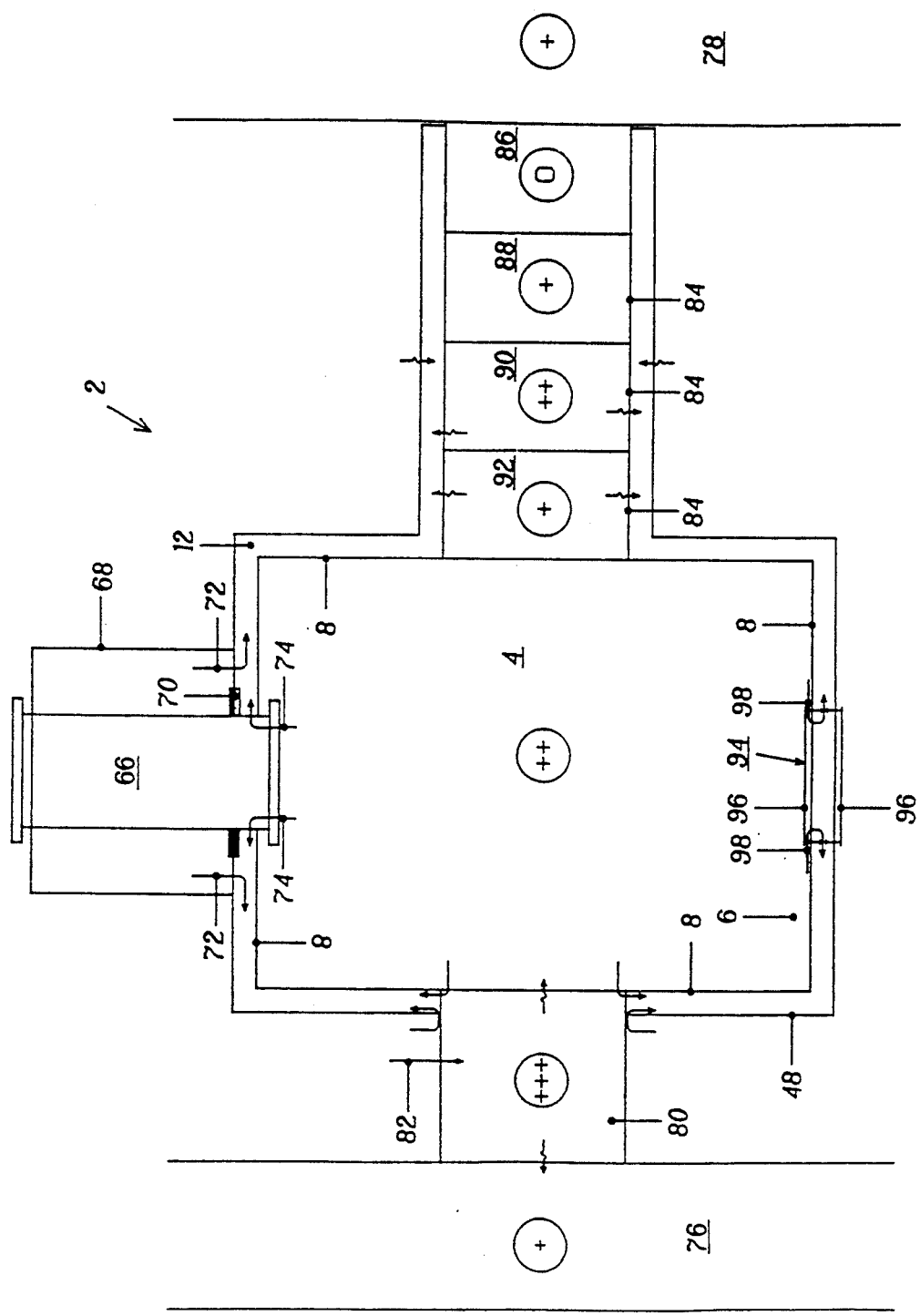

Embodiments of the invention will now be described solely by way of example and with reference to the accompanying drawings in which:

FIG. 1 is a schematic side view of a first clean containment room construction; and FIG. 2 is a schematic plan view of part of a second clean containment room construction.

Referring to FIG. 1, there is shown a clean containment room construction 2 comprising a work room 4 having a floor 6, walls 8 and a ceiling 10. The clean containment room construction 2 also has an isolation void 12 which surrounds the walls 8 and the ceiling 10 of the work room 4. The floor 6 of the work room 4 is solid so that it is not necessary for the isolation void 12 to extend also underneath the floor 6.

The clean containment room construction 2 has air-circulating apparatus 14 for maintaining a circulation of air in the work room 4 which is at a positive pressure with respect to atmospheric pressure. The clean containment room construction 2 also has air-evacuating apparatus 16 for maintaining air in the isolation void 12 which is at a negative pressure with respect to atmospheric pressure.

The air-circulating apparatus 14 circulates air as shown through a conduit 18 and a filter known as a HEPA (high efficiency particulate air) filter 20 and into the work room 4. The circulating air leaves the work room 4 via a pair of HEPA filters 22 and a pair of conduits 24. Air from the conduits 24 is re-circulated to the air-circulating apparatus 14 via a return air line 26. Additional air as required is provided along an air line 28 which connects to the air line 26 upstream of the air-circulating apparatus 14.

The air-evacuating apparatus 16 is shown in the form of a fan. The air-evacuating apparatus 16 sucks air from the isolation void 12 to maintain the air in the isolation void 12 at a negative pressure. The air is sucked through a HEPA filter 30 prior to passing through the air-evacuating apparatus 16 and being exhausted to atmosphere via exhaust air line 32.

The clean containment room construction 2 is provided with lights 34 which are provided in a light trough 36. The clean containment room construction 2 is further provided with an electrical conduit 38 for providing electrical power for equipment (not shown) in the work room 4. The clean containment room construction 2 is still further provided with a pipe 40 for providing gas and/or liquid services to the work room 4. Both the electrical conduit 38 and the pipe 40 have been shown schematically for ease of illustration.

Formalin or other sterilising or neutralising agent may be introduced as shown by arrow 42. The low level introduction of the formalin or other sterilising or neutralising agent may be at various strategic points in the walls 8 of the work room 4. The formalin produces formaldehyde gas for use in sterilising the isolation void 12.

The clean containment room construction 2 is such that the walls 8 are constructed as standard metal stud partitioning with perforated cross members. All wall materials are then sealed for use of the formaldehyde gas or other sterilising or neutralising agent in the isolation void 12. The isolation void 12 is typically 2-4 inches (5-10 cm) wide.

Areas where leaks may possibly occur from the work room 4 into the isolation void 12 and also from the outside environment into the isolation void 12 are shown by arrows marked with the word LEAK. With regard to the electrical conduit 38, it will be appreciated that air from the atmosphere could pass along the inside of the electrical conduit 38, that is between the electrical wiring and the usual outer sheath. For this reason, the electrical conduit 38 is provided with a hole 44 so that any air leaking from the atmosphere along the electrical conduit 38 can escape into the isolation void 12. Similarly, any contaminant materials leaking into the electrical conduit 38 from the work room 4 can escape via a hole 46 in the electrical conduit 38 into the isolation void 12.

With regard to the pair of conduits 24, air leaking between the conduits 24 and an outside wall 48 of the isolation void 12 leaks only into the isolation void 12 as shown by the arrows 50.

Contaminants escaping from the work room 4 through the ceiling 10 escape only into the isolation void 12 as shown by the arrow 52. Similarly, contaminants escaping through the light trough 36 escape only into the isolation void 12 as shown by the arrows 54.

Atmospheric air leaking around the conduit 18 and into the isolation void 12 is shown by the arrows 56.

Contaminants from the work room 4 leaking through a seal 58 for the pipe 40 escape only into the isolation void 12 as shown by arrow 60. Similarly, contaminated air passing from the atmosphere and getting past a seal 62 for the pipe 40 is only able to enter the isolation void 12 as shown by arrow 64.

Referring now to FIG. 2, there is shown part of a second clean containment room construction 2. Similar parts as in FIG. 1 have been given the same reference numerals for ease of comparison and understanding. FIG. 2 has been given to illustrate a different clean containment room construction to that shown in FIG. 1 and for simplicity of illustration, FIG. 2 does not show its air-circulating apparatus 14 and its air-evacuating apparatus 16.

It will be seen that the clean containment room construction 2 shown in FIG. 2 is provided with an autoclave chamber 66. The autoclave chamber 66 is surrounded by an autoclave casing 68 as shown. The autoclave chamber 66 has a sealing flange 70 for ensuring that any air leaking from the autoclave casing 68 leaks as shown by the arrows 72 into the isolation void 12 which is at a negative pressure. Air at positive pressure in the work room 4 and leaking past the autoclave chamber 66 passes into the isolation void 12 as shown by the arrows 74.

The clean containment room construction 2 shown in FIG. 2 is shown positioned between a pair of corridors 76, 78. The corridors 76, 78 are maintained at a positive pressure. Materials in the work room 4 are able to leave the work room 4 and enter the corridor 76 via a pass through hatch 80. The pass through hatch 80 is at a higher pressure than the pressure in the corridor 76 and also in the work room 4. The relative pressures are illustrated schematically by plus signs in FIG. 2. The relative positive pressures ensure that HEPA filtered air passing into the pass through hatch 80 as shown by arrow 82 passes into the corridor 76 and also into the work room 4, thus ensuring the required isolation of the work room 4.

Persons wishing to enter the work room 4 do so from the corridor 78 which is also maintained at a positive pressure. The persons have to pass through interlocked doors 84 as shown which create a black area 86, a grey area 88, a white area 90 and an air lock 92. The relative pressures in the various areas 86, 88, 90, 92 are shown by the illustrated signs, where "0" denotes atmospheric pressure and where "+" denotes a pressure above atmospheric pressure. The required isolation of the work room 4 is thus assured.

As can be seen from FIG. 2, one wall 8 is provided with a sealed window 94. The sealed window 94 has window panes 96 on each side of the isolation void 12. Small holes are provided in the reveal of the window 94 to create the same suction pressure between the window panes 96 that is in the isolation void 12. Thus any air from the work room 4 and leaking past the inside of the window 94 can leak into the isolation void 12 as shown by the arrows 98.

It will thus be seen from the drawings that the clean containment room constructions 2 are able to operate in a very clean manner with the work rooms 4 being at a positive pressure and the isolation voids 12 being at a negative pressure. With such positive and negative pressures, the work rooms 4 are substantially fully isolated from the environment and are such that contaminants in the work rooms 4 cannot escape to the environment, and are also such that contaminants in the environment cannot enter into the work rooms 4.

It is to be appreciated that the embodiments of the invention described above with reference to the accompanying drawings have been given by way of example only and that modifications may be effected. Thus, for example, if the work room 4 shown in FIG. 1 were to be such that the floor 6 was raised and was not airtight, then the isolation void 12 will extend underneath the floor 6. Also, more or less than the illustrated two filters 22 and their associated conduits 24 may be employed.

I claim:

1. A clean containment room construction which comprises a work room having a floor, walls and a ceiling, an isolation void which surrounds the walls and the ceiling of the work room, air-circulating means which maintains a circulation of air in the work room which is always at a positive pressure with respect to atmospheric pressure, and air-evacuating means which maintains air in the isolation void which is always at a negative pressure with respect to atmospheric pressure whereby air in the work room can leak into the isolation void but air in the isolation void cannot leak into the atmosphere, and whereby air in the isolation void cannot leak into the work room, and an entrance section with interlocking doors defining a first entrance area which is maintained at atmospheric pressure, a second entrance area which is maintained at a pressure above atmospheric pressure, a third entrance area which is maintained at a pressure above atmospheric pressure, and a fourth entrance area which is maintained at a pressure above atmospheric pressure, and the pressure in the third entrance area being higher than the pressure in the second and fourth entrance areas.

2. A clean containment room construction according to claim 1 and including a pass through hatch area by means of which materials in the work room are able to leave the work room, the pass through hatch area being maintained at a pressure which is higher than the pressure in the third entrance area.

3. A clean containment room construction according to claim 2 and including a first corridor which accesses with the pass through hatch area, and a second corridor which accesses with the first entrance area, the first and the second corridors being maintained at a pressure which is substantially equal to the pressure in the second and fourth entrance areas.

4. A clean containment room construction according to claim 1 and including filter means for filtering the air into and out of the room, and for additionally filtering the air from the isolation void before the air from the isolation void is vented to atmosphere.

5. A clean containment room construction according to claim 4 in which the filter means is a plurality of high efficiency particulate air filters.

6. A clean containment room construction according to claim 5 and including a sealed window having window panes on each side of the isolation void.

7. A clean containment room construction according to claim 6 in which the air-evacuating means is a fan.

8. A clean containment room construction according to claim 5 and including an autoclave chamber.

* * * * *